March 30, 1965     R. J. LAHR     3,175,481
DOCUMENT COPIER

Filed May 2, 1960     4 Sheets-Sheet 1

INVENTOR
ROY J. LAHR
Ralph C. Dustin
ATTORNEY

March 30, 1965   R. J. LAHR   3,175,481
DOCUMENT COPIER

Filed May 2, 1960   4 Sheets-Sheet 3

March 30, 1965     R. J. LAHR     3,175,481

DOCUMENT COPIER

Filed May 2, 1960     4 Sheets-Sheet 4

United States Patent Office 3,175,481
Patented Mar. 30, 1965

3,175,481
DOCUMENT COPIER
Roy J. Lahr, Lexington, Ky., assignor to International Business Machines Corporation, New York, N.Y., a corporation of New York
Filed May 2, 1960, Ser. No. 26,278
1 Claim. (Cl. 95—75)

This invention relates to document copiers and more particularly to a device capable of copying documents with different reflecting qualities onto photo or light sensitive copy paper.

Some of the short comings of dry copy devices are that they are not capable of copying various types of documents, such as opaque documents, documents with color printing, ink signatures and carbon copies; also the permanence of these copies is such that their life is limited when exposed to light. It is accordingly the prime object of this invention to provide an improved document copier capable of copying nearly all printed or written material in a manner that the photosensitive copy paper may have either an opaque or a transparent back, but yet produce a right-reading, positive copy thereon.

Another object is to provide a document copier in which the document to be copied and the copy paper therefore travel in relationship to each other to produce a positive image.

Yet another object is to provide an improved document copier capable of producing a latent readable copy by directing light reflected from the surface of the document to the light sensitive surface of a copy sheet.

Still another object is to provide a document copier utilizing fiber optics as a light transmitter.

Another object is to provide a document copier capable of copying opaque documents by a light transmitting process.

The foregoing and other objects, features and advantages of the invention will be apparent from the following more particular description of a preferred embodiment of the invention, as illustrated in the accompanying drawings.

Figure 1:
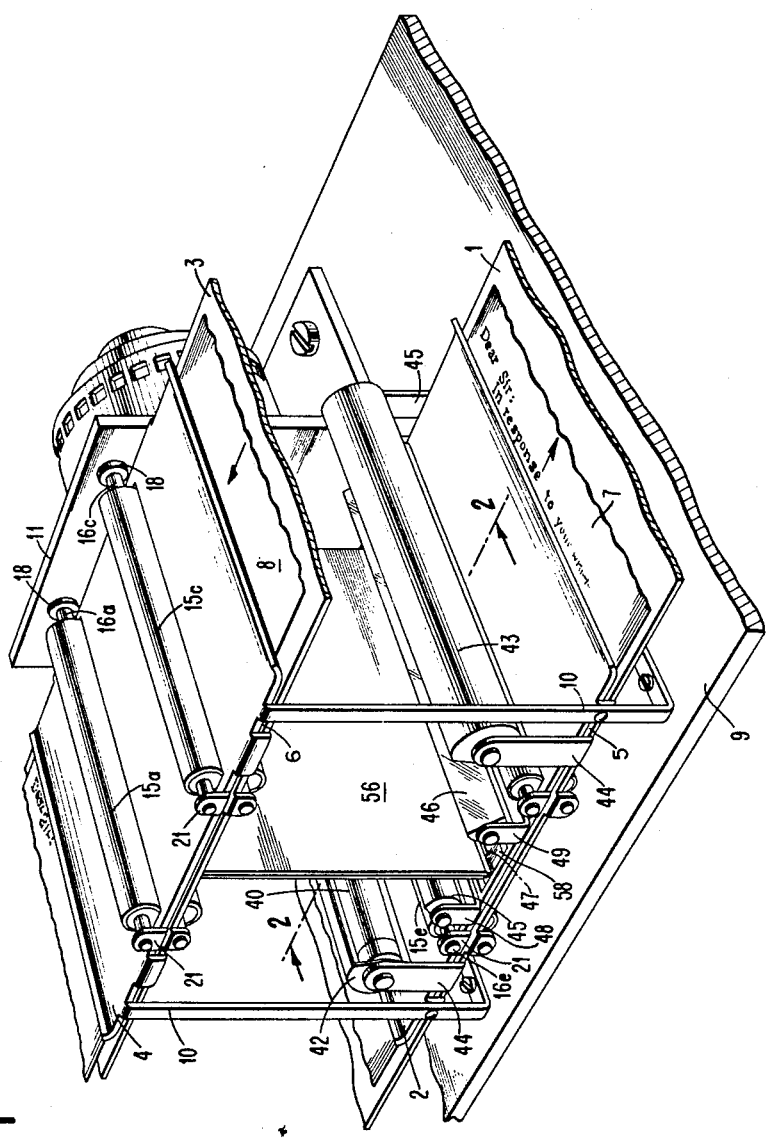
FIG. 1 is a perspective view of the improved copying mechanism.

There are shown in FIG. 1 parallel plates 1 and 2 and 3 and 4 formed to create passageways 5 and 6 for a source document 7 and a sheet of copy paper 8. Plates 1 to 4 are supported parallel to each other above a base member 9 by end frames 10 and a side plate 11. Since this copier is based on a reflection rather than a diffusion principle, the document 7 can be of any opaque or translucent material, with white or colored printing on one or both sides. The only requirement is that there be a reflective contrast between the background and the information to be copied. The document, for example, may even be a photograph.

Any light or photosensitive copy paper can be used. The specific embodiment shown in the drawings consists of a black paper coated with a thin, transparent film of photosensitive diazonium in a polymeric vehicle. Upon exposure to light, the diazo decomposes and there is produced a gas which collects at nucleating centers, forming small bubbles during thermal development. When developed, these bubbles become permanent voids in the polymeric structure causing the exposed areas to appear white in reflected light. In the dark areas of the document 7, the transparent film would remain clear allowing the black backing to remain visible.

Although a particular type photosensitive copy paper is described, the invention could utilize any photosensitive or light sensitive copy paper provided the appropriate light source and development process were utilized.

Rollers 15a through 15h (FIG. 3) are mounted on shafts 16a through 16h and serve as feeding means for the document 7 and the copy paper 8. One end of the shafts 16a, 16c, 16f and 16h is journaled in a bearing 18 in the side plate 11 while the other end is supported by an end piece 21 of plates 1, 2, 3 and 4. Shafts 16b, 16d, 16e and 16g are mounted in a like manner with the exception that the shafts extend through the side plate 11 and have fixed thereon drive gears 24b, 24d, 24e and 24g.

Figure 3:
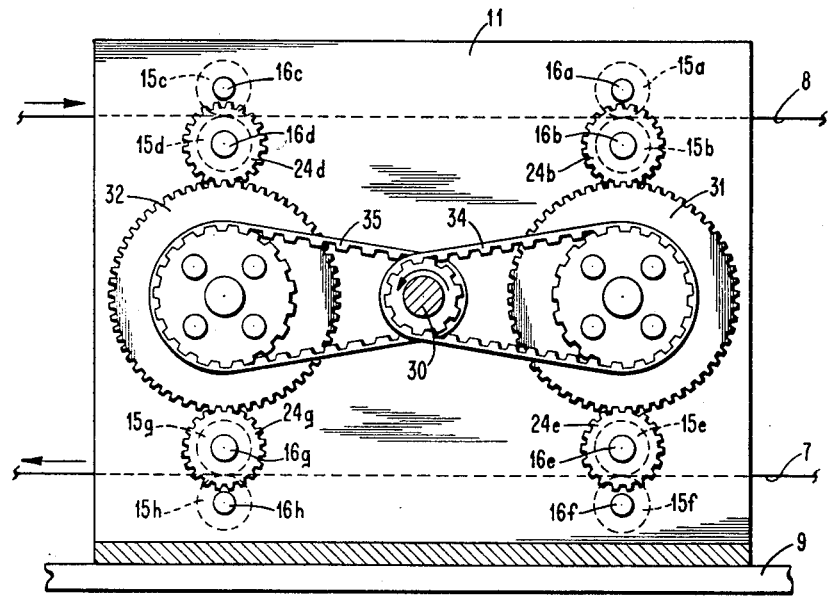
FIG. 3 is a side view of the mechanism showing the driving means therefor.

Any suitable drive means may be used. One embodiment, as shown in FIG. 3, consists of a motor drive shaft 30 rotating in the direction shown in the drawing and continuously driving gears 31 and 32 by belts 34 and 35. Gear 31 drives gears 24b and 24e while gear 32 drives gears 24d and 24g to provide the drive to the rollers 15 which in turn provide the friction drive for the document 7 and the copy paper 8. The drive mechanism components are selected to give a one to one ratio or to turn the document rollers at the same speed that the copy paper rollers are rotated.

In order to illuminate the document, there are provided light sources 40 and 41 mounted in reflectors 42 and 43 which are fixed to plate 2 by end brackets 44. One embodiment of this light source could be ultra violet lamps having a central wave length of approximately 3800° A.

The emergent light rays of lamps 40 and 41 are focused through converging lenses 45 and 46 into a single intense line of light 47 extending transversely across the document 7. Lenses 45 and 46 are supported at their ends by end pieces 48 and 49 fixed to plate 2.

Figure 2:
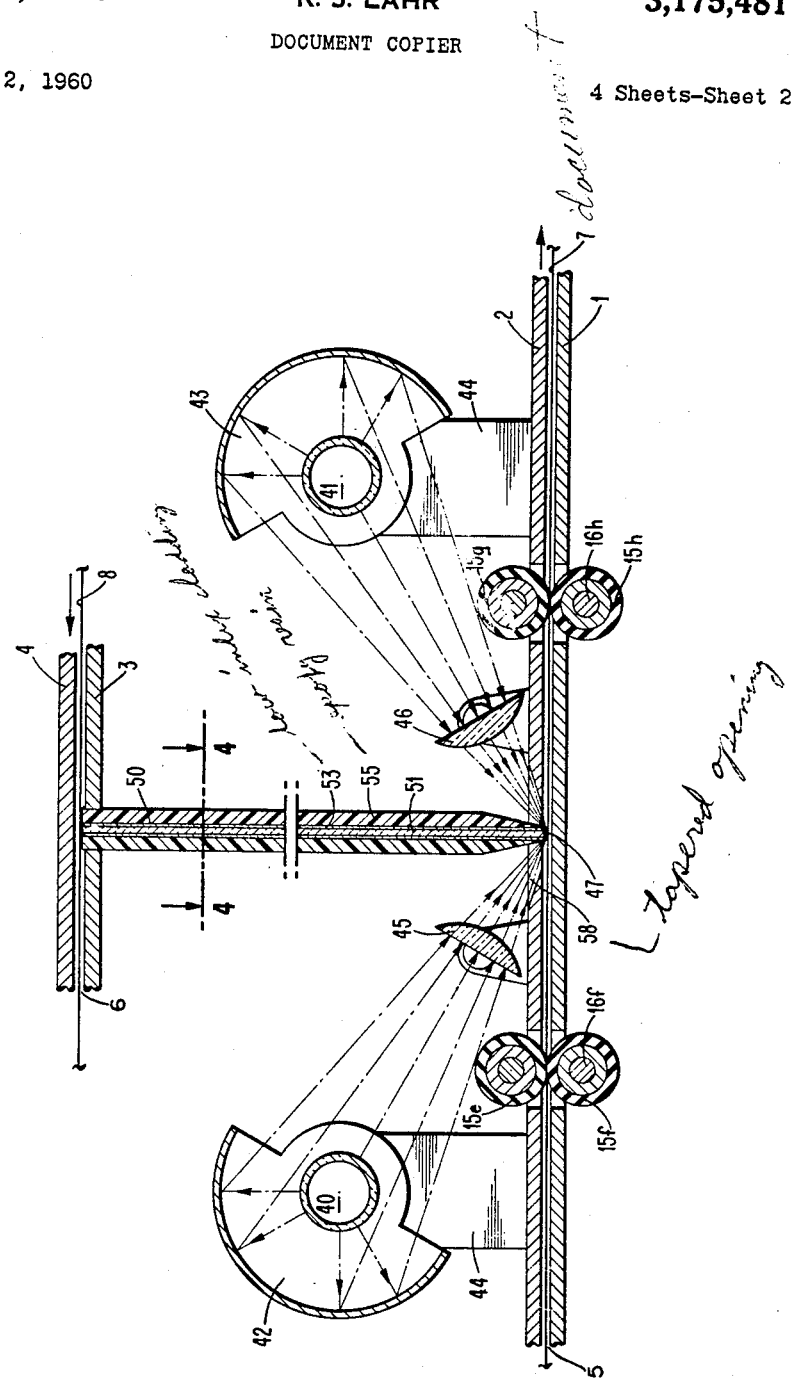
FIG. 2 is a cross-sectional view of the mechanism taken on the line 2—2 in FIG. 1.
Figure 4:
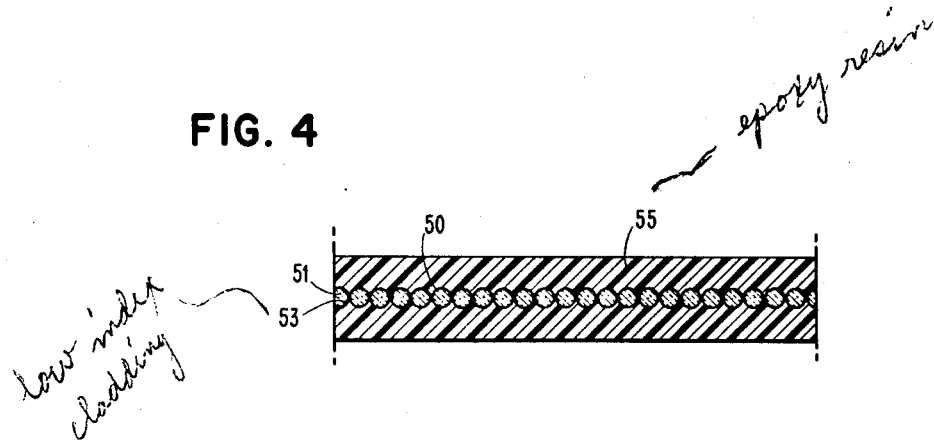
FIG. 4 is an enlarged cross sectional view of the fiber optic array taken on the line 4—4 of FIG. 2.

In order to transmit the reflected light from the source document 7 to the copy paper 8, there are provided a plurality of optical fibers 50 arranged adjacent each other in a linear plane extending across the document 7 immediately over the light line 47. As best shown in FIG. 4, each optical fiber 50 consists of a rod 51 made of high-quality optical glass, quartz or some other optically transparent material with a given index of refraction coated or clad with a thin jacket of transparent material 53, whose index of refraction is lower than that of the rod. Each of the fibers is only a few mils in diameter and transmits light from a very small area on the document to a corresponding small area on the copy sheet. Fiber optics of the type described are further explained in the July 6, 1959 issue of "Design News," published by Rogers Publishing Co., 3375 S. Bannock, Englewood, Colorado. In the embodiment shown in FIGURES 1, 2 and 4, a plurality of the described fibers 50 are cast in epoxy resin 55 or supported by any other suitable means which is then fixed to the underside of plate 3 by any suitable method. The lower portion of the support medium 55 is tapered so as not to restrict the focusing of the light by the lenses 45 and 46. The ends of the fiber array 56 must be smooth, free from defects and positioned as close to the document 7 and the copy paper 8 as is possible without making actual contact. With the arrangement of the fiber array 56 as shown in FIG. 4, there will be a row of light spots substantially forming a continuous line of light, available for clear, positive copying.

There is a cutout area of the plate 2, just beneath the fiber array 56, forming a tapered opening 58 transversing the document 7 and permitting the converging light rays to strike the document 7 and be reflected.

The operation of the apparatus is as follows:

As the document 7 is fed face-up into the passageway 5 in the direction indicated on the drawings, rollers 15e and 15f provide the drive to move the document into the area of the light rays. At the same time a copy paper 8 is inserted, with its photosensitive side face down, into the upper passageway 6 where rollers 15c and 15d provide the drive necessary to move the document in the opposite direction to that of the document but at the same speed. As the document 7 reaches the transverse focal line of light 47, the reflection from the dark areas will not be as great as that of the lighter areas. Since the optic fiber array 56 is immediately over the focal line 47, the major portion of the reflected light will be captured by the ends of the fibers 50. The fiber 50 is designed so that light entering one end is unable to escape through the side because of the total internal reflection. It will thus transmit the light captured from the document to the copy paper in incremental components and, because of the nature of the optical array, that light will combine into a continuous straight transverse transmitted light line of varied intensity depending upon the incremental light and dark contrast of the document 7.

Figure 5:
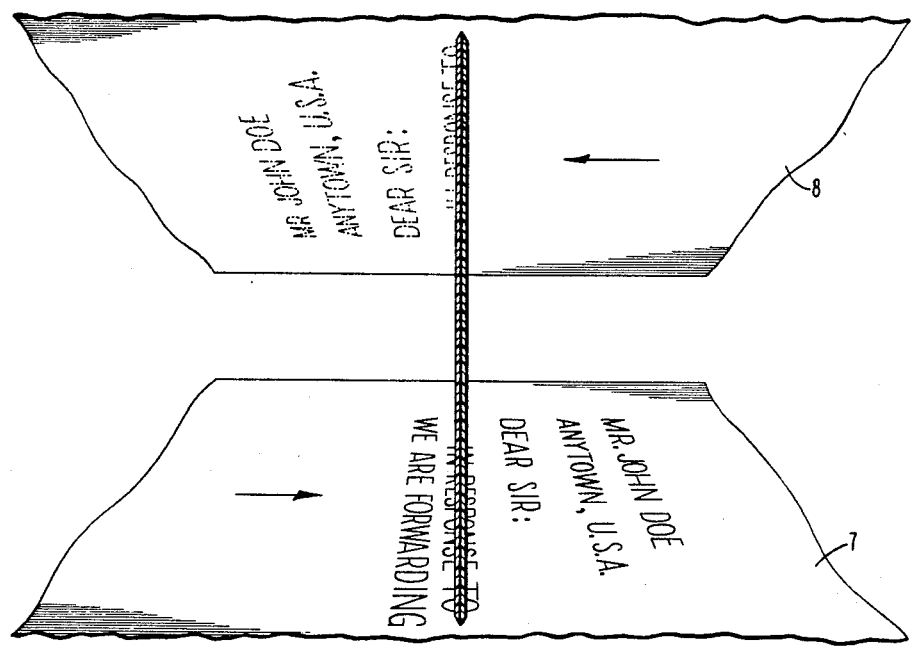
FIG. 5 is an enlarged sectional perspective view showing the source document, the fiber array and the copy paper.

As the document continues to feed through the line of light, the optical array 56 will scan successive increments of the document 7 and transmit different light and dark patterns to the copy paper. As the document 7 and the copy paper 8 are fed through the optical plane, the combination of the continuous successive incremental light and dark patterns will combine to produce latent images of the document, being copied in a reverse direction but positive and right reading fashion. This is best illustrated by FIG. 5.

This latent image can then be developed in a manner appropriate to the particular sensitizing coating of the copy paper 8 used.

While there has been described one form which the invention may assume in practice, it will be understood that it may be modified and embodied in various other forms without departing from the spirit or the scope of the appended claim.

What is claimed is:

An apparatus for producing on a photosensitive surface a right reading copy of characters and other information appearing on a document to be copied comprising, in combination:

means for illuminating at least a line on said document;

a plurality of optical fibers for transmitting reflections of light directly from said line on said document to remote points lying in a line corresponding to said light line;

each of said optical fibers having transverse end dimensions which are small in any direction compared to the dimensions of said characters and said other information;

said plurality of optical fibers being arranged in a group and extending from said line on said document to said line corresponding to said light line;

said group of optical fibers having first and second spaced outer composite surfaces;

means for effecting relative movement between said group of optical fibers and said document in one direction from said first to said second composite surfaces to cause line scanning of said document;

a photosensitive surface disposed to record visual information appearing along said line corresponding to said light line; and means for effecting relative movement between said group of optical fibers and said photosensitive surface in another direction from said second to said first composite surface which, relative to said optical fibers, is opposite to said one direction to cause a right reading copy of said document to be formed on said photosensitive surface.

References Cited by the Examiner

UNITED STATES PATENTS

| | | | |
|---|---|---|---|
| 2,198,115 | 4/40 | John. | |
| 2,410,104 | 10/46 | Rainey. | |
| 2,419,836 | 4/47 | Holbrook | 88—1 X |
| 2,852,651 | 9/58 | Crumrine et al. | 88—24 X |
| 3,060,805 | 10/62 | Brumley | 88—24 X |
| 3,125,013 | 3/64 | Herrick et al. | 95—75 |

FOREIGN PATENTS 285,738   2/28   Great Britain.

NORTON ANSHER, *Primary Examiner.*

EMIL G. ANDERSON, *Examiner.*